United States Patent [19]

Kita et al.

[11] Patent Number: 4,710,335
[45] Date of Patent: Dec. 1, 1987

[54] METHOD OF PRODUCING ELECTRIC CELL ANODE USING POWDERY ACTIVE MATERIAL

[75] Inventors: Yasushi Kita; Shiro Moroi, both of Ube, Japan

[73] Assignee: Central Glass Company, Limited, Ube, Japan

[21] Appl. No.: 743,931

[22] Filed: Jun. 12, 1985

[30] Foreign Application Priority Data

Jun. 13, 1984 [JP] Japan ................... 59-119915

[51] Int. Cl.$^4$ ................................................ H01M 4/26
[52] U.S. Cl. ..................................... 264/105; 264/104; 429/217
[58] Field of Search ................. 264/104, 105; 429/217

[56] References Cited

U.S. PATENT DOCUMENTS

| 2,977,351 | 3/1961 | Wiley | 264/9 |
| 3,271,195 | 9/1966 | Berchielli | 264/104 |
| 4,216,045 | 8/1980 | Mirioka | 264/104 |

FOREIGN PATENT DOCUMENTS

| 1133441 | 9/1953 | Fed. Rep. of Germany | 429/217 |
| 48-19450 | 6/1973 | Japan | 429/217 |
| 53-74242 | 7/1978 | Japan | |
| 58-48360 | 3/1983 | Japan | |
| 1225068 | 3/1971 | United Kingdom | 429/217 |
| 197710 | 10/1977 | U.S.S.R. | 429/217 |

*Primary Examiner*—James Derrington
*Attorney, Agent, or Firm*—Fleit, Jacobson, Cohn & Price

[57] ABSTRACT

Using a positive active material in powder form such as a metal salt or graphite fluoride, an anode for use in an electric cell, and particularly suitable for use in an organic electrolyte cell, is produced by the steps of dispersing the active material, and a conductive material such as carbon powder where necessary, in a solution of an organic polymer used as binder in a suitable liquid, mixing the dispersion with another liquid in which the polymer is substantially insoluble so as to cause precipitation of the polymer in a state intimately mixed with the active material and the conductive material, separating the solid phase mixture from the liquid phase and drying it, and press-shaping the dried mixture into an anode body of a desired shape. By mixing the binder with the active material in this manner, it is possible to obtain an anode body sufficient in mechanical strength and high in electrochemical activity by using only a very small amount of binder.

5 Claims, 2 Drawing Figures

METHOD OF PRODUCING ELECTRIC CELL ANODE USING POWDERY ACTIVE MATERIAL

BACKGROUND OF THE INVENTION

This invention relates to a method of producing an anode of an electric cell by using a powdery active material and a binder.

In one type of organic electrolyte cells using a light metal such as lithium or sodium as the active material of the cathode, the active material of the anode can be selected from some kinds of compounds including metal oxides, metal halides, metal sulfides, silver chromate and graphite fluoride. To form any of such positive active materials into an anode body, usually it is necessary to mix a binder with the active material. Where the active material is low in conductivity it is also necessary to add a conductive material such as graphite, carbon black or a suitable metal powder.

In general, selection of a binder for forming an electrode body is an important factor in constructing an electric cell. In organic electrolyte cells of the aforementioned type, the binder for forming the anode body must be selected from limited polymers that are stable to the organic liquid used in the electrolyte, such as polyethylene, polypropylene and fluorocarbon resins such as polytetrafluoroethylene and copolymers of polytetrafluoroethylene with polyhexafluoropropylene. When any of these polymers in powder form is used as the binder, it is necessary for uniform dispersion of the binder in the active material and for realization of good formability that the binder occupies about 20% of the mixed material for the anode. Accordingly, if the mixed material contains 10% of a conductive material, the content of the positive active material becomes as low as about 70%. Furthermore, covering of the active material surfaces with such a large amount of binder results in a considerable decrease in electrochemically active surface areas of the anode and consequently in lowering of the cell characteristics.

For reducing such unfavorable phenomena and for improving the manner of mixing of the binder with the active material of the anode, it is prevailing to use a fluorocarbon resin in the form of an aqueous emulsion. For similar purposes, Japanese patent application primary publication No. 53-74242 (1978) proposes to use an aqueous dispersion of styrene-butadiene rubber as the binder and Japanese patent application primary publication No. 58-48360 (1983) an aqueous dispersion of nitrile-butadiene rubber. However, even when a binder of the aqueous emulsion or dispersion type is used still it is necessary that the binder occupies at least about 8 wt % of the anode for affording sufficient strength to the anode. It is desired to further decrease the amount of the binder without sacrificing the physical properties of the formed anode body.

SUMMARY OF THE INVENTION

It is an object of the present invention to provide a method of producing an excellent anode of an electric cell by using a powdery active material, with addition of a conductive material if necessary, and only a small amount of a binder.

The present invention provides a method of producing an anode for use in an electric cell, the method comprising the steps of preparing a dispersion of a positive active material in finely divided form in a solution of an organic polymer which is employed as a binder in a first liquid, mixing the dispersion with a second liquid in which the polymer is substantially insoluble so as to cause precipitation of the polymer in a state intimately mixed with the active material, separating the mixture of the active material and the precipitated polymer from the liquid phase, drying the separated mixture, and forming the dried mixture into an anode body of a desired shape by application of a pressure.

When the active material is not sufficiently high in conductivity, a conductive material in finely divided form is dispersed in the polymer solution together with the active material.

The primary advantage of the method according to the invention resides in that an anode body for use in an electric cell, which may be an organic electrolyte cell, can easily be produced with sufficiently high mechanical strength by using only a very small amount of an organic polymer as binder. For example, a fully practicable anode body of graphite fluoride containing about 10 w % of carbon as a conductive material can be obtained even when the amount of the binder is less than 1 wt %. Furthermore, a cell using an anode produced by this method exhibits better characteristics than another cell of the same type using an anode of the same active material produced by a conventional method. That is, the cell using the method according to the invention is higher in the utilization factor of the positive active material, is higher in the discharge voltage through a given resistance and is better in the flatness of the voltage-time curves.

The true reasons for such favorable effects of the present invention have not been elucidated yet. Probably, the precipitation of the initially dissolved polymer in the presence of the dispersed active material will have the effect of affording adequate porosity to the press-shaped anode body besides the effect of accomplishing very good mixing of the binder with the active material and strongly binding the active material with a small amount of the binder, and the porosity of the anode body will serve the purpose of retaining the electrolyte liquid and accordingly will lead to an increase in electrochemically active surface areas. Then it is natural that the cell exhibits improved characteristics.

DESCRIPTION OF THE PREFERRED EMBODIMENTS

Figure 1:
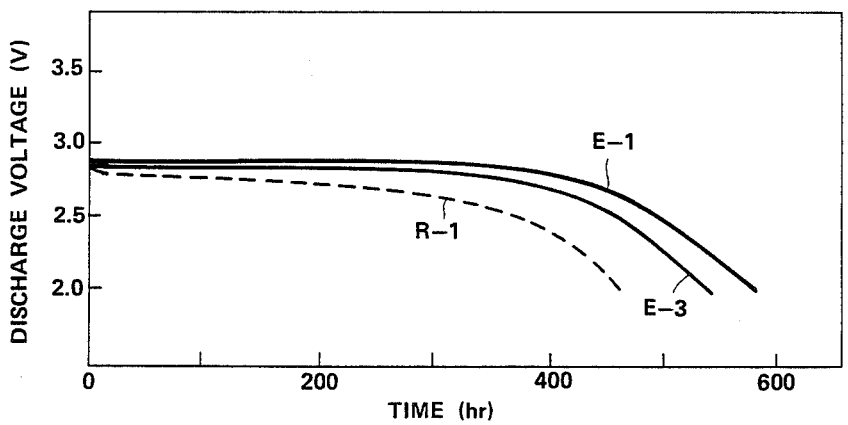
FIG. 1 shows discharge curves of two lithium cells each having an anode produced by a method according to the invention by using poly(dicarbon monofluoride) as active material and another lithium cell having an anode of the same active material produced by a conventional method.

Conventional positive active materials suitable for electric cell anodes are of use in the present invention insofar as they are available in powder form. Typical examples are metal oxides, metal halides, metal sulfides, silver chromate and graphite fluoride which may be either poly(carbon monofluoride), $(CF)_n$, or poly(dicarbon monofluoride), $(C_2F)_n$. Though not limitative, an excellent graphite fluoride anode can be produced by the method according to the invention. Together with a selected active material, a powder of a conductive material such as graphite, carbon black or aluminum is used except when the active material is sufficiently high in conductivity.

A binder, which is used for binding and integrating the active material powder or the powder mixture of active material and conductive material, is selected from organic polymers which are soluble in at least one kind of solvent that is practicable and stable to organic electrolyte liquids used in electric cells. The binder may be either a synthetic resin or a synthetic rubber. For example, polyethylene, polypropylene, poly(vinyl chloride), poly(vinylidene chloride) and fluorocarbon resins such as poly(vinylidene fluoride) and poly(vinyl fluoride) are named as useful binders.

A polymer selected as binder is dissolved in a suitable solvent which is usually an organic solvent, and a selected active material for an anode is uniformly dispersed in the binder solution together with, where necessary, a conductive material. Then the dispersion is mixed with another liquid in which the binder is substantially insoluble. The last-mentioned liquid is used in a relatively large quantity so that the initially dissolved binder may substantially entirely precipitate. The liquid mixing operation is carried out under efficient stirring in order to well mix the precipitating binder with the active material and conductive material dispersed in the initial solution. As the result, a dispersion of an intimate and powdery mixture of the binder and active material, and conductive material when it is used, in a mixed liquid is obtained. The liquid used for the precipitation purpose is selected from those which are miscible with and compatible with the initially used solvent. For example, water or methyl alcohol is suitable when dimethylformamide or dimethylacetamide is used as the solvent for poly(vinylidene fluoride) or poly(vinyl chloride), and methyl alcohol or ethyl alcohol is suitable when benzene or toluene is used as the solvent for polyethylene or polypropylene.

After the above treatment, the binder-containing active material is separated from the liquid phase and dried after washing. The dried material is disintegrated or crushed into a powder of suitable particle size and is formed into an anode body of a suitable shape by pressing in a metal die.

The invention will further be illustrated by the following nonlimitative examples.

EXAMPLE 1

An anode plate for a lithium cell was produced by using graphite fluoride $(C_2F)_n$ as active material, carbon black as conductive material and poly(vinylidene fluoride) as binder.

First 0.3 g of poly(vinylidene fluoride) was dissolved in 70 ml of dimethylformamide at room temperature, and 10 g of a powder of the graphite fluoride and 1 g of carbon black were well dispersed in the solution. The thus prepared dispersion was mixed with 200 ml of water by intense stirring. Then the solid matter was separated from the mixed liquid by filtration and was dried at 170° C. for 16 hr. The dried material was disintegrated into a powder, and 170 mg of the powder was press-shaped into a 16 mm diameter disc by application of a pressure of 4000 kg/cm$^2$.

The disc-shaped graphite fluoride anode produced by the above process was used in a lithium cell, which was comprised of the anode, a cathode plate formed of 50 mg of metallic lithium, a separator sheet of polypropylene nonwoven cloth and an electrolyte liquid which was 1 mole/liter solution of lithium borofluoride in a mixture of 1 part by volume of propylene carbonate and 1 part by volume of dimethoxyethane.

At room temperature this lithium cell was left to continuous discharge through a 15 KΩ resistor. In FIG. 1, the discharge curve E-1 represents the result of this test.

REFERENCE 1

Using the same graphite fluoride $(C_2F)_n$ powder as in Example 1, an anode plate for a lithium cell was produced by a known method.

In 100 ml of water to which 1 ml of a surfactant (ADEKANOL B-722 of Asahi Denka Co.) was added in advance, 10 g of the graphite fluoride powder, 1 g of carbon black and 1.67 g of an aqueous dispersion of polytetrafluoroethylene (Teflon 30-J of Mitsui Fluorochemicals Co., resin content 60%) were well mixed by stirring. The thus prepared aqueous dispersion was filtered to recover the solid matter, which was dried at 120° C. for 16 hr. The dried material was disintegrated into a powder, and 170 mg of the powder was press-shaped into a 16 mm diameter disc under a pressure of 4000 kg/cm$^2$.

The disc-shaped graphite fluoride anode produced in this manner was used in a lithium cell, which was identical with the one mentioned in Example 1 except the change of the anode. The discharge characteristic of this cell was tested by the same method as in Example 1. The result was as represented by the discharge curve R-1 in FIG. 1.

EXAMPLE 2

Figure 2:
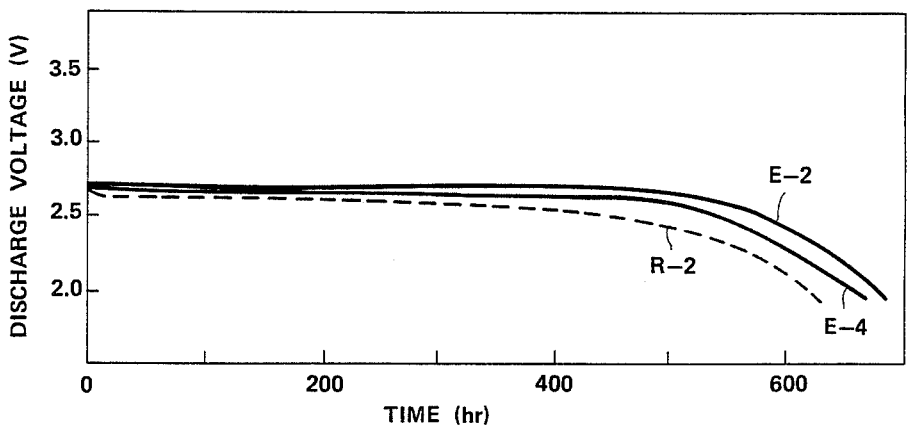
FIG. 2 shows discharge curves of two lithium cells each having an anode produced by a method according to the invention by using poly(carbon monofluoride) as active material and another lithium cell having an anode of the same active material produced by a conventional method.

In place of the graphite fluoride $(C_2F)_n$ used in Example 1, a powder of another type of graphite fluoride $(CF)_n$ was used as a positive active material for a lithium cell. Otherwise, the anode producing process and the construction of a lithium cell in Example 1 were repeated, and the discharge characteristic of the cell was tested by the same method as in Example 1. In FIG. 2, the discharge curve E-2 represents the result of the test in Example 2.

REFERENCE 2

Using the same graphite fluoride $(CF)_n$ powder as in Example 2, an anode plate for a lithium cell was produced by the method described in Reference 1, and this anode was substituted for the anode of Example 2 in the lithium cell described in Example 1. The discharge characteristic of the resultant cell was tested by the same method. The result was as represented by the curve R-2 in FIG. 2.

EXAMPLE 3

First 0.6 g of polyethylene was dissolved in 60 ml of benzene at 70° C., and 10 g of graphite fluoride $(C_2F)_n$ powder used in Example 1 and 1 g of carbon black were dispersed in the solution. The thus prepared dispersion was mixed with 200 ml of ethyl alcohol by intense stirring. Then the solid matter was separated from the liquid phase and was dried at 60° C. under vacuum for 16 hr. The dried material was disintegrated into a powder, and 170 mg of the powder was press-shaped into a 16 mm diameter disc under a pressure of 4000 kg/cm$^2$.

The graphite fluoride disc produced in this manner was used as the anode in a lithium cell, which was identical with the one mentioned in Example 1 except the change of the anode. The discharge characteristic of this cell was tested by the same method as in Example 1. The result was as represented by the curve E-3 in FIG. 1.

EXAMPLE 4

First 0.5 g of poly(vinyl chloride) was dissolved in 70 ml of dimethylacetamide at room temperature, and 10 g of the graphite fluoride $(CF)_n$ powder used in Example 2 and 1 g of carbon black were well dispersed in the solution. The thus prepared dispersion was mixed with 200 ml of water by intense stirring. Then the solid matter was separated from the mixed liquid by filtration and was dried at 70° C. under vacuum for 16 hr. The dried material was disintegrated into a powder, and 170 mg of the powder was press-shaped into a 16 mm diameter disc under a pressure of 4000 kg/cm$^2$.

The graphite fluoride disc produced in this manner was used as the anode in a lithium cell, which was identical with the one mentioned in Example 1 except the change of the anode. The discharge characteristic of this cell was tested by the same method. The result was as represented by the curve E-4 in FIG. 2.

What is claimed is:

1. A method of producing an anode for use in a lithium cell, the method comprising the steps of:

preparing a dispersion of a graphite flouride in finely divided form, which is employed as an active material, and an electically conductive material in finely divided form in a solution of an organic polymer, which is employed as binder, in a first liquid;

mixing said dispersion with a second liquid in which said polymer is substantially insoluble so as to cause precipitation of said polymer in a state intimately mixed with said graphite flouride and said conductive material;

separating the mixture of said graphite flouride, said conductive material and the precipitated polymer from the mixed liquid;

drying the separated mixture; and froming the dried mixture into an anode body of a desired shape by application of a pressure.

2. A method according to claim 1, wherein said conductive material is carbon.

3. A method according to claim 1, wherein said polymer is selected from the group consisting of poly(vinylidene fluoride) and poly(vinyl chloride).

4. A method according to claim 1, wherein said polymer is selected from the group consisting of poly(vinylidene fluoride) and poly(vinyl chloride), said first liquid being selected from the group consisting of dimethylformamide and dimethylacetamide, said second liquid being selected from the group consisting of water and methyl alcohol.

5. A method according to claim 1, wherein said polymer is selected from the group consisting of polyethylene and polypropylene, said first liquid being selected from the group consisting of benzene and tuluene, said second liquid being selected from the group consisting of methyl alcohol and ethyl alcohol.

* * * * *